United States Patent [19]

Sakamaki

[11] Patent Number: 5,329,166
[45] Date of Patent: Jul. 12, 1994

[54] COORDINATE READING SYSTEM FOR DETECTING OPERATION STATES OF NUMEROUS SWITCHES

[75] Inventor: Mitsuo Sakamaki, Tokyo, Japan
[73] Assignee: Seiko Instruments Inc., Japan
[21] Appl. No.: 994,647
[22] Filed: Dec. 22, 1992
[51] Int. Cl.[5] .................................... G06K 11/00
[52] U.S. Cl. ................................ 307/129; 178/18; 340/706; 345/156
[58] Field of Search .............. 307/101, 112, 113, 116, 307/125, 129, 149; 178/18, 19, 20; 340/706

[56] References Cited

U.S. PATENT DOCUMENTS

| | | | |
|---|---|---|---|
| 4,672,154 | 6/1987 | Rodgers et al. | 178/18 |
| 4,886,943 | 12/1989 | Suzuki et al. | 178/18 |
| 4,916,740 | 4/1990 | Noda et al. | 178/18 |
| 5,023,408 | 6/1991 | Mrakami et al. | 178/19 |
| 5,128,174 | 6/1991 | Grat et al. | 178/18 |
| 5,162,782 | 11/1992 | Yoshioka | 178/18 |
| 5,220,324 | 6/1993 | Morita | 178/18 |

FOREIGN PATENT DOCUMENTS 0347725 12/1989 European Pat. Off. .
0461614 12/1991 European Pat. Off. .
0499641 8/1992 European Pat. Off. .

*Primary Examiner*—Jeffrey A. Gaffin
*Attorney, Agent, or Firm*—Bruce L. Adams; Van C. Wilks

[57] ABSTRACT

The object of the present invention is to enable detecting operation states of numerous switches in a cordless coordinate reading system. The coordinate reading system body is provided with the switching circuit for selecting the excitation signal, so that one of the groups of sense lines can be excited with a plurality of frequencies. The coordinate indicator is provided with the resonant circuit and the groups of devices for setting frequency which modify the resonance frequency of the resonant circuit in accordance with the press of the switch, enable the resonant circuit to resonate with any one of a plurality of the resonance frequencies, and further slightly modify the resonance frequency. Further, the coordinate reading system body is provided with the circuit for detecting the phase contrast between the induced signal from the coordinate indicator and the excitation signal. Thereby, it is possible to detect the switch which is pressed down among the numerous switch from the excitation frequencies and the phase contrast data.

6 Claims, 6 Drawing Sheets

5,329,166

COORDINATE READING SYSTEM FOR DETECTING OPERATION STATES OF NUMEROUS SWITCHES

BACKGROUND OF THE INVENTION

The present invention relates to a wireless coordinate reading system using an electromagnetic coupling phenomenon. More specifically, the invention relates to a coordinate reading system which can detect operation states of numerous switches provided on a coordinate indicator.

Various methods have been proposed for detecting operation states of switches of a coordinate indicator in the conventional wireless coordinate reading system. One known method is to transfer a switch signal by using infrared rays. Another known method is to modify a resonance frequency of a resonant circuit and make the resonant circuit resonate with an excitation signal, and then detect the operation states from a degree of the phase shift.

Further, as to a method for detecting a position of a coordinate indicator, a cord can be eliminated from the coordinate indicator because of the existence of the invention (hereinafter referred to as Prior Application No. 1) which was proposed by the applicant of the present invention before the present application. Brief description will be given for this invention. Two groups of sense lines are arranged along each of xy rectangular coordinate axes respectively, and each line of the one group of sense lines is sequentially excited by an excitation circuit. When a coordinate indicator having a resonant circuit which resonates with the above excitation signal is brought close to the sense lines, induced signals which are induced on the other group of sense lines are sequentially processed by a signal processing circuit. Then, a position of the coordinate indicator, that is, a coordinate is detected from the level of the induced signals which are processed.

The method using infrared radiation to transfer the switch signal has directivity, and therefore has the following drawbacks. The structure becomes complicated and the system becomes heavier and larger, so that the operability deteriorates. For instance, the coordinate indicator itself requires a transmitter and a large capacity cell. Further, there is another drawback that the difference in phase data between respective switches is too small to detect operation states of numerous switches only from the degree of a shift in phase, and therefore stable detection is difficult.

SUMMARY OF THE INVENTION

An object of the present invention is to provide a coordinate reading system which can detect operation states of numerous switches and has good operability.

The inventive coordinate reading system has two types of structures. In order to solve the above conventional problems, a first structure comprises a coordinate reading system body and a coordinate indicator. The coordinate reading system body includes:

a first group of sense lines which is parallel to one of xy rectangular coordinate axes and has a plurality sense lines arranged at equal intervals, a second group of sense lines which is parallel to the other of the xy rectangular coordinate axes and has a plurality of sense lines arranged at equal intervals, a first scanning circuit which sequentially selects each line of the first group of sense lines, a excitation means for outputting excitation signals capable of outputting a plurality of frequencies, a switching circuit which is connected to the first scanning circuit and the excitation means for selecting one of excitation signals corresponding to a plurality of the frequencies respectively and supplying the selected excitation signal to the first scanning circuit, a second scanning circuit which sequentially selects each line of the second group of sense lines, a phase detection circuit which is connected to the second scanning circuit for detecting a phase contrast between an induced signal induced on the second group of sense lines and the selected excitation signal, and a control circuit which identify a pressed switch among switches on the coordinate indicator from the phase contrast signal detected by the phase detection circuit and the excitation frequency. Further, the coordinate indicator includes:

a resonant circuit composed of a coil and a capacitor, and a group of devices for setting a resonance frequency for enabling the resonant circuit to resonate with each of the excitation signals corresponding to a plurality of the frequencies by being connected to the resonant circuit by the press of the switch and further for slightly shifting each of the frequencies.

In a second structure, the coordinate reading system body includes:

an adding circuit connected to the first scanning circuit and an excitation means for outputting excitation signals corresponding to a plurality of frequencies for adding up a plurality of the excitation signals into one excitation signal and supplying the excitation signal to the first scanning circuit, a frequency discriminating circuit connected to the second scanning circuit for discriminating a frequency of an induced signal induced on the second scanning circuit, and a switching circuit for selecting an excitation signal having the same frequency as that of the induced signal from the excitation means with a frequency data from the frequency discriminating circuit. Further, the switching circuit and the frequency discriminating circuit are connected to the phase detection circuit.

In a third structure, the coordinate reading system body includes:

a control circuit which determines a pressed switch on a coordinate indicator from a phase contrast signal detected by a phase detection circuit. Further, the coordinate indicator includes:

a plurality of resonant circuits which are composed of a coil and a capacitor respectively and can resonate with one of the excitation signals of corresponding to a plurality of the frequencies respectively, a group of devices for setting a resonance frequency, each of the devices being provided in each of a plurality of the resonant circuits for slightly modifying each resonance frequency by being connected to the corresponding resonant circuit respectively, and a switching circuit which is provided in each of a plurality of resonant circuits for simultaneously selecting each of the group of devices for setting a resonance frequency and connecting the selected devices to each of the resonance circuits respectively.

In the inventive coordinate recording system having the first structure, the resonant circuit of the coordinate indicator is resonated by an AC magnetic field which is generated from the first group of sense lines and an induced signal is induced on the second group of sense lines by an AC magnetic field generated from the coordinate indicator which resonates. The feature is applied that the phase of the induced signal shifts by slightly modifying the resonance frequency of the coordinate indicator at that time.

First of all, any one of the first group of the sense lines is excited by a first frequency to determine if an induced signal is generated. If the induced signal is generated, a position of the coordinate indicator is detected. Then, each of the scanning circuits selects the sense line which is the closest to the position of the coordinate indicator respectively in response to the signal from the control circuit, and the degree of the phase shift between the induced signal and an excitation signal at this time is detected. As the resonant circuit which is resonating for that period is connected with any one of a first group of devices for setting a resonance frequency which is selected in response to the states of the switches, the degree of the phase shift to be detected depends on the state of the switching circuit.

When the induced signal is not generated, any one of the first group of sense lines is excited further with another frequency just like the above, and a position of the coordinate indicator is detected from the induced signal. Then, a degree of a phase shift between the induced signal at that time and the excitation signal. The degree of this shift is also determined depending on the state of the switching circuit.

By preparing the system that can stably detect a plurality of switching states from the degree of a phase shift at one frequency as mentioned above, it is possible to use a plurality of frequencies for stably detecting the many states of switching circuit from the data of the frequencies resonated and the phase shift data.

Further, in the coordinate reading system having the second structure, excitation signals corresponding to a plurality of frequencies are added up into one excitation signal and the first group of sense lines is excited with the excitation signal. Thereby, it is possible to obtain the induced signal depending on the state of the resonant circuit of the coordinate indicator without switching an excitation frequency and to shorten the detection time.

Furthermore, in the coordinate reading system having the third structure, the first group of the sense lines is excited by the frequency which resonates with one of the plural resonant circuits and a position of the coordinate indicator is detected. Then, each of the scanning circuits selects the sense line which is the closest to the position of the coordinate indicator respectively in response to the signal from the control circuit, and the degree of the phase shift at this time is detected. As the resonant circuit which is being resonated for that period is connected with the device for setting a resonance frequency which is selected by the switching circuit, the degree of the phase shift to be detected depends on the state of the switching circuit.

Further, when the degree of a phase shift is detected in the same way by use of the frequency which resonates with other resonant circuit, the degree of this phase shift also depends on the state of the switching circuit.

By preparing the system that can stably detect a plurality of states of the switching circuit from the degree of the phase shift of one frequency, it is possible to stably detect the states of numerous switching circuit from the combination of phase data of plural frequencies.

DETAILED DESCRIPTION OF THE PREFERRED EMBODIMENTS

Referring to FIGS. 1-7, embodiments of this invention will be described. FIGS. 1(a)-1(b) illustrate a structure of a coordinate reading system.

Figure 1A:
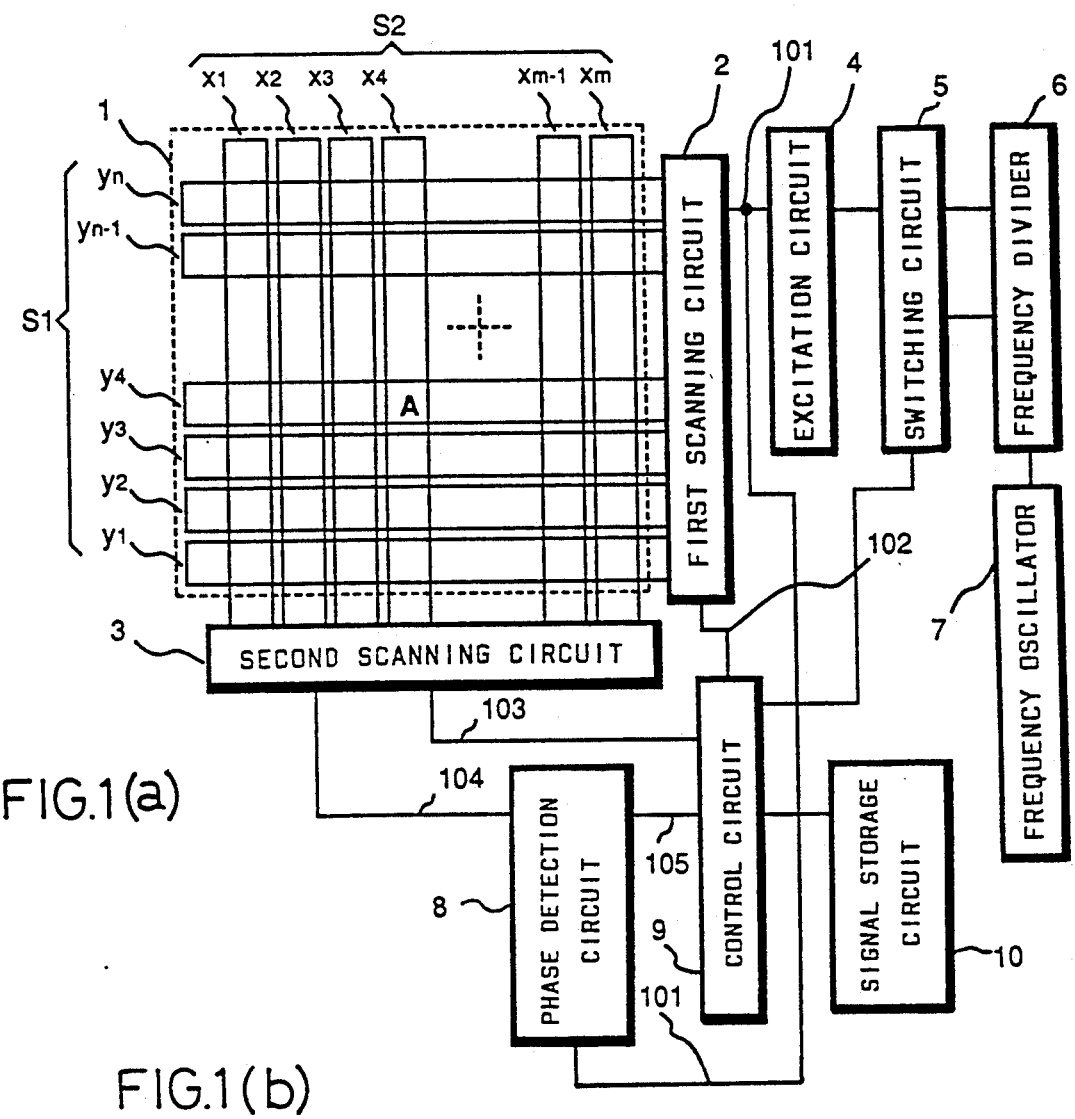
FIGS. 1(a)-1(b) are block diagrams showing an embodiment of the present invention.
Figure 1B:
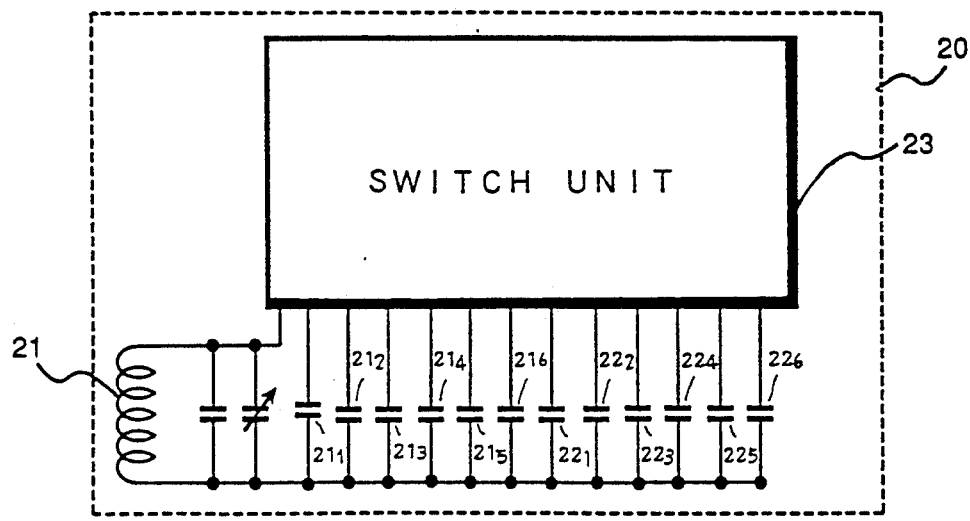

In FIGS. 1(a)-1(b) shows groups of sense lines, S1 is a first group of sense lines including sense lines $y_1$-$y_n$, S2 is a second group of sense lines including sense lines $x_1$-$x_m$, 2 is a first scanning circuit for sequentially selecting each of the first group of sense lines S1, 3 is a second scanning circuit for sequentially selecting each of the second group of sense lines S2, 4 is an excitation circuit for exciting the first group of sense lines S1, 5 is a switching circuit for switching from an excitation signal of one frequency to an excitation signal of other frequency, 6 is a frequency divider dividing an inputted frequency into some frequencies and for supplying excitation signals of different frequencies to the switching circuit, 7 is a frequency oscillator for supplying a basic signal to the frequency divider, 8 is a phase detection circuit for comparing the phases of an induced signal which is generated on the second group of sense lines S2 and the excitation signal and detecting a phase contrast between the two signals, 9 is a control circuit composed of a general CPU circuit, 10 is a signal storage circuit for storing a digitized phase contrast signal, 20 shows a coordinate indicator, 21 is a resonant circuit composed of a coil and a capacitor for resonating with a first resonance frequency, $21_1$-$21_6$ represent a first group of devices for setting a resonance frequency which, by being connected with the resonant circuit 21, composes the resonant circuit capable of resonating with the first excitation frequency and slightly modifies each of resonance frequencies of the resonant circuit, $22_1$-$22_6$ represent a second group of devices for setting a resonance frequency which, by being connected with the resonant circuit 21, modifies a resonance frequency, composes the resonant circuit capable of resonating with a second resonance frequency, and further slightly changes the resonance frequency of the resonant circuit, and 23 is a switch unit composed of many switches for connecting the first and second groups of devices for setting a resonance frequency to the resonant circuit 21 in response to the press of the switches.

Figure 2:
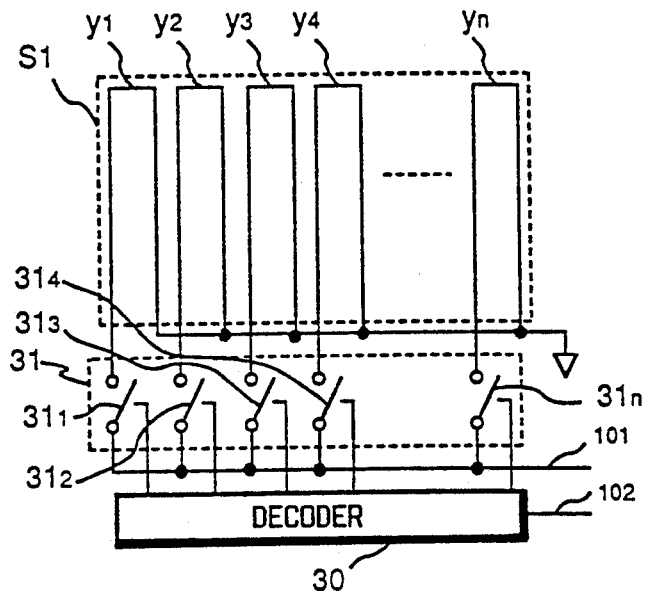
FIG. 2 is a detailed block diagram of the scanning circuit.

FIG. 2 is a detailed block diagram of the first scanning circuit 2. In this figure, the same signs as those used in FIGS. 1(a)-1(b) indicate the same objects as indicated in FIG. 1(a)-1(b). 30 is a decoder, 31 is a group of analog switches including switching devices $31_1$-$31_n$, 101 is an excitation signal outputted from the excitation circuit 4, and 102 is a selection signal outputted from the control circuit 9. Though a detailed drawing of the second scanning circuit 3 is not shown here, the structure of this circuit is equivalent to that of the first scanning circuit 2. The difference between the two circuits is that the first scanning circuit 2 is inputted with the excitation signal 101 and, on the other hand, the second scanning circuit 3 outputs the induced signal 104.

Figure 3:
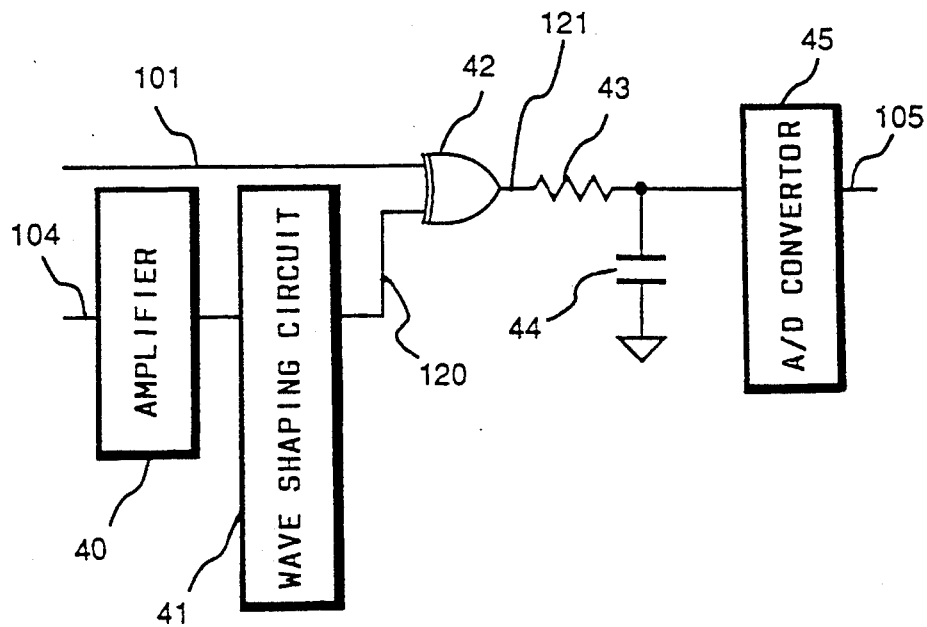
FIG. 3 is a detailed block diagram of the phase detection circuit.

FIG. 3 is a detailed block diagram of the phase detection circuit 8. 40 is an amplifier, 41 is a wave shaping circuit, 42 is an EX-OR circuit, and 43 and 44 are a resistor and a capacitor respectively, which compose an integral circuit. 45 is an A/D converter. 101 is the excitation signal, 104 is the induced signal via the second scanning circuit 3, and 105 is a phase contrast signal outputted to the control circuit 9.

Figure 4:
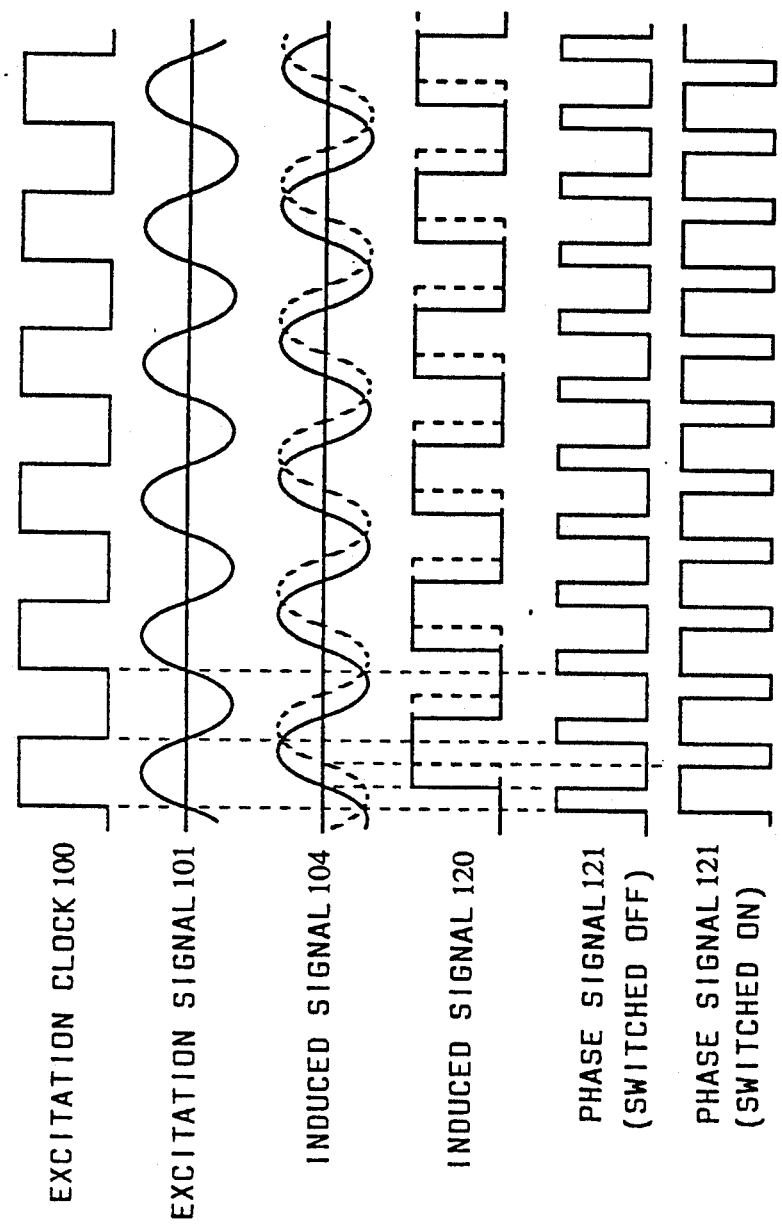
FIG. 4 is a waveform charts of the respective signals.

FIG. 4 shows waveforms of the respective signals.

Figure 5:
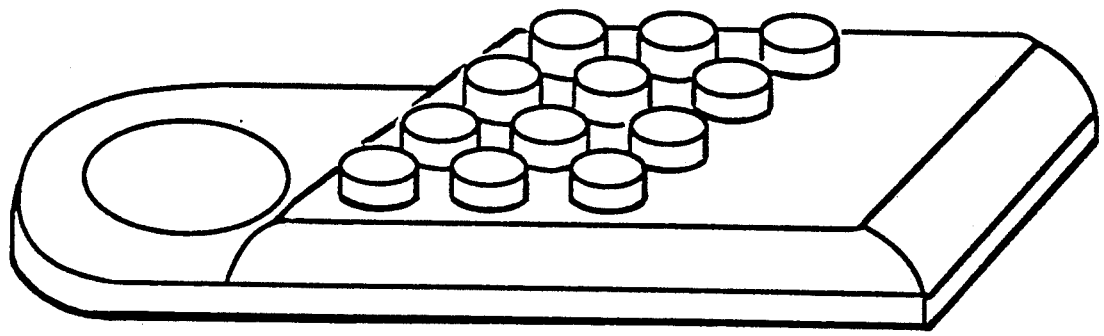
FIG. 5 is a perspective diagram of the coordinate indicator of the present invention.
Figure 6:
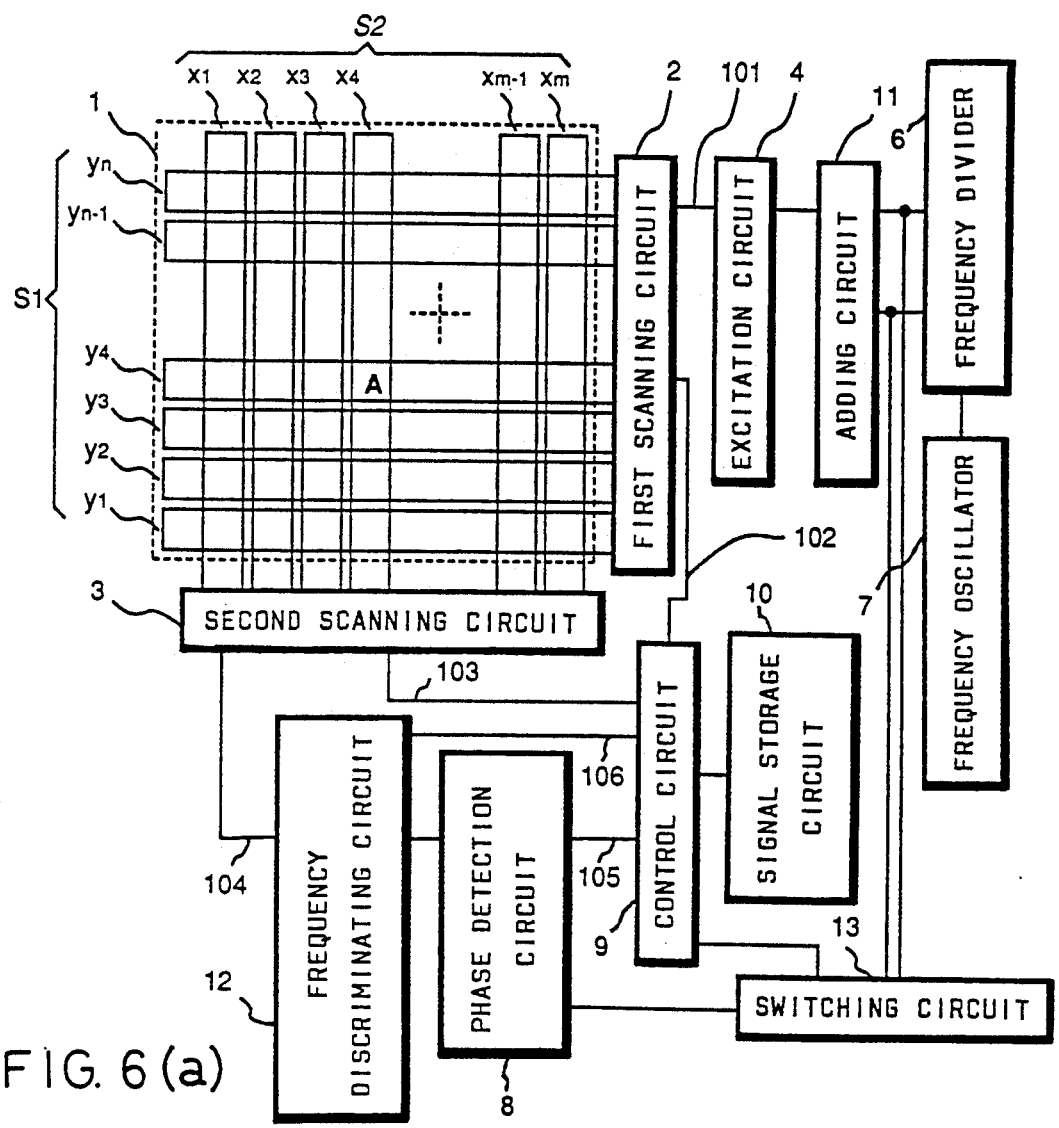
FIGS. 6(a)-6(b) are block diagrams showing one of the other embodiments of the present invention.
Figure 6:
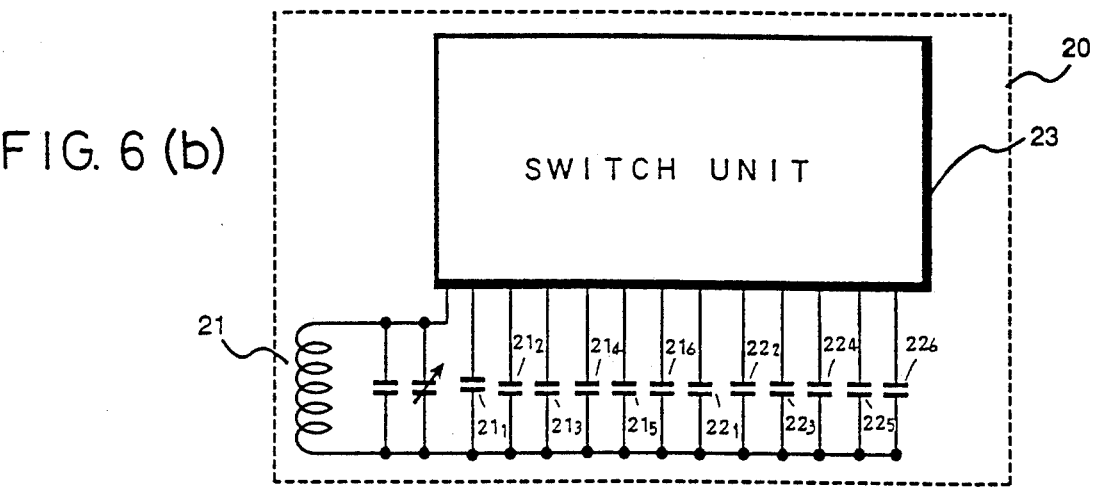
Figure 7:
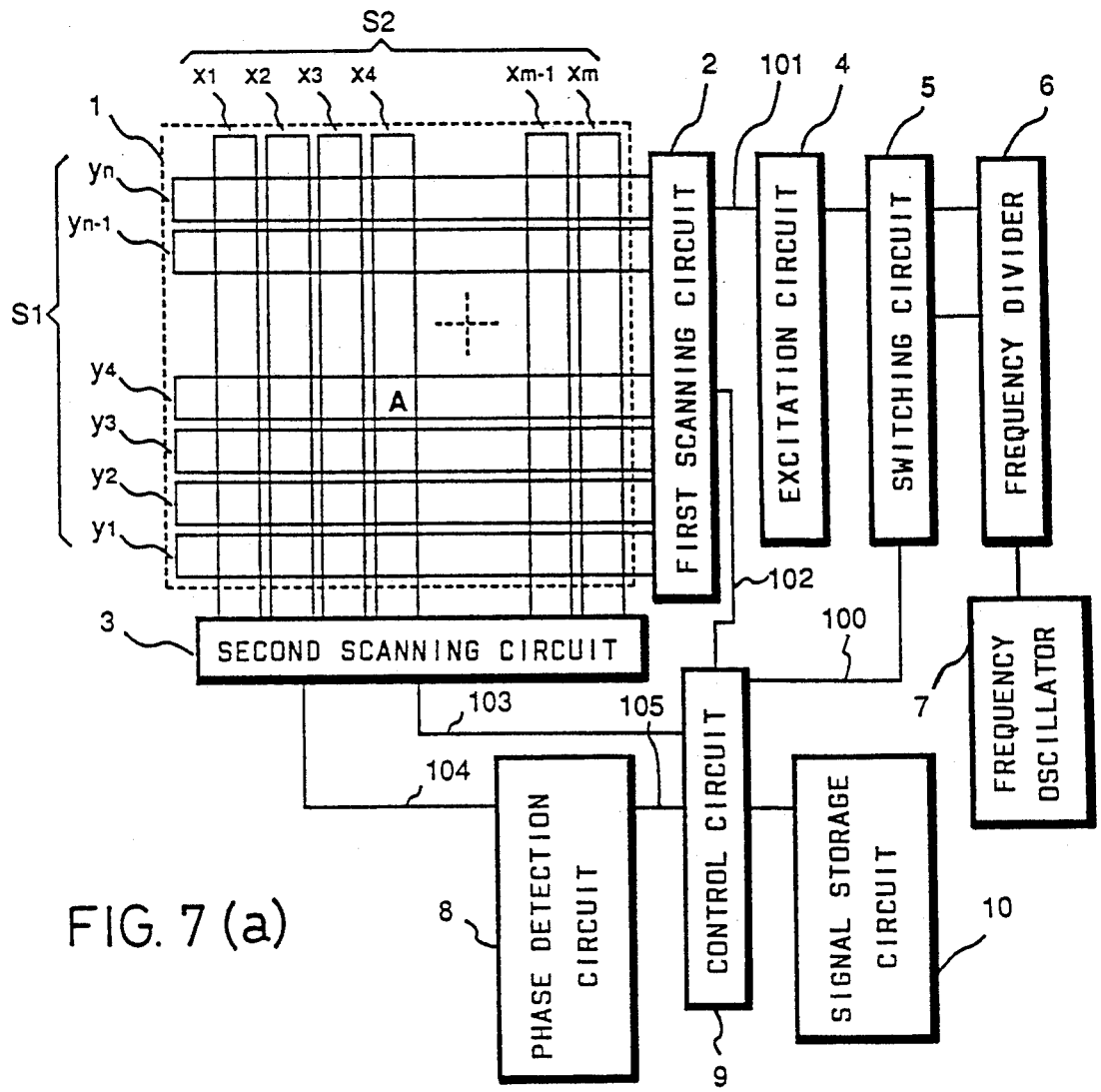
FIGS. 7(a)-(b) block diagrams showing one of the other embodiments of the present invention.
Figure 7:
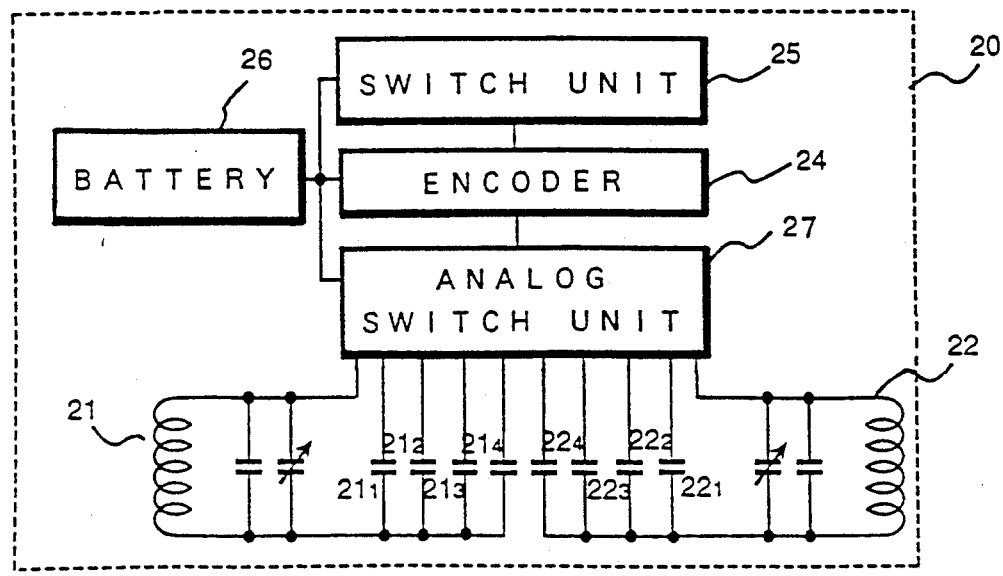

FIG. 5 is a perspective diagram of an embodiment of the coordinate indicator.

The operation of this embodiment will be explained below.

An explanation will be given as to the case that in FIGS. 1(a)-1(b) the coil which composes the first resonant circuit 21 of the coordinate indicator 20 is located at the point where a sense line $x_4$ and a sense line $Y_4$ cross (a portion A in FIG. 1). The frequency oscillator 7 oscillates at a basic frequency of 1.2288 MHz. The frequency divider 6 divides the signal by two and four and supplies clock signals of 614.4 kHz and 307.2 kHz to the switching circuit 5 respectively. First of all, the control circuit 9 controls the switching circuit 5 by a control signal 100 to supply a signal of 614.4 kHz as a first excitation signal to the excitation circuit 4. Then, the excitation circuit 4 supplies the excitation signal 101 (a sine wave of 614.4 kHz) to the first scanning circuit 2.

Any line of the first group of sense lines S1 is selected by the first scanning circuit 2 and an AC magnetic field by the excitation signal is generated from the selected line. If the resonant circuit 21 of the coordinate indicator 20 is placed in the vicinity of the selected sense line when the resonant circuit 21 of the coordinate indicator 20 resonates with the excitation signal in this case, the induced signal is induced on the resonant circuit. Further, an induced signal is generated on any line of the second group of sense lines which is in the vicinity of the resonant circuit.

First of all, an explanation will be given as to a case that an induced signal is generated by the first excitation signal. A position of the coordinate indicator 20 is detected by the method described in the Prior Application No. 1. The first scanning circuit 2 selects the sense line $Y_4$ of the first group of sense lines S1 with the selection signal 102 supplied from the control circuit 9. The second scanning circuit 3 selects the sense line $x_4$ of the second group of sense lines S2 with the selection signal 103 supplied from the control circuit 9.

In other words, in FIG. 2 the decoder 30 turns on the analog switch $31_4$ with the selection signal 102, and supplies the excitation signal 101 (the sine wave of 614.4 kHz) supplied from the excitation circuit 4 to the sense lines $Y_4$ of the first group of sense lines by way of the first scanning circuit 2, and then a magnetic field of 614.4 kHz is generated form the sense liens $Y_4$. As the first resonant circuit 21 of the coordinate indicator 20 is set up to resonate with the frequency of the first excitation signal at that time, the induced signal of 614.4 kHz is induced on the first resonant circuit 21. Further, an induced signal is generated on the second group of sense liens S2 in the vicinity of the first resonant circuit 21 by the induced signal on the first resonant circuit 21. On the other hand, the second scanning circuit 3, as well as the first scanning circuit, selects the sense line $x_4$ of the second group of sense lines by the selection signal 103 supplied from the control circuit 9, and supplies the induced signal 104 which is supplied from the resonant circuit 21 of the coordinate indicator 20 to the phase detection circuit 8.

Next, referring to FIGS. 3 and 4 the operation of the phase detection circuit 8 will be explained. First of all, the induced signal 104 induced on the sense line $x_4$ is amplified by the amplifier 40, and is shaped into a rectangular wave as the induced signal 120 shown in FIG. 4 by the wave shaping circuit 41. Then, the phases of the included signal 120 which is wave-shaped and the induced signal 120 is compared with the excitation signal 101 by the EX-OR circuit, and thereby a phase signal 121 is obtained, which changes depending on the degree of a phase shift. The phase signal 121 is integrated and converted into a dc voltage signal by the integrating circuit which is composed of the resistor 43 and the capacitor 44, and is binarized by the A/D converter 45. Then, the binarized phase signal 105 is taken into the control circuit 9 and is stored in the signal storage circuit 10 with frequency data of the excitation signal.

The potential of the phase signal 105 in the above case is determined by a slight difference between the resonance frequency of the resonant circuit 21 of the coordinate indicator 21 and the frequency of the excitation signal 101. That is, the potential corresponds to the press of the switch unit 23 of the coordinate indicator 20 and is determined depending on which device is connected with the resonant circuit 21 among the first group of devices for setting a resonance frequency $21_1$-$21_6$.

Next, an explanation will be given as to a case that an induced signal is not generated by the first excitation signal. The control circuit 9 controls the switching circuit 5 with the control signal 100 to supply a second excitation signal of 307.2 kHz to the excitation circuit 4. The excitation signal 101 (a sine wave of 307.2 kHz) is supplied from the excitation circuit 4 to the first scanning circuit 2, and a position of the resonant circuit 21 of the coordinate indicator 20 is again detected by the method described in the Prior Application No. 1. The control circuit 9 controls the first scanning circuit 2 and the second scanning circuit 3 with the selection signals 102,103 respectively to select the sense line which is the closest to a position of the resonant circuit 21 of the coordinate indicator 20 among the first and second groups of sense lines S1 and S2 respectively. As the resonant circuit 21 of the coordinate indicator 20 is connected with any one of the second group of devices for setting a resonance frequency $22_1$-$22_6$, so as to resonate with the frequency of the second excitation signal, an induced signal of 307.2 kHz is induced on the resonant circuit 21.

Further, an induced signal is generated on the second group of sense lines S2 in the vicinity of the resonant circuit 21 by the induced signal of the resonant circuit 21, and the induced signal 104 is supplied to the phase detection circuit 8. Then, like a case of the operation of the first resonant circuit, a phase contrast signal between the induced signal and the binarized second excitation signal can be obtained by the phase detection circuit 8. The phase contrast signal is taken into the control circuit 9 and stored in the signal storage circuit 10 again with frequency data of the excitation signal.

The potential of the phase contrast signal 105 is determined by the difference between the resonance frequency of the resonant circuit 21 of the coordinate indicator 20 and the frequency of the second excitation signal 101 like a case of the first excitation frequency. That is, the potential corresponds to the press of the switch unit 23 of the coordinate indicator 20 and is determined depending on which device is connected with the resonant circuit 21 among the second group of devices for setting a resonance frequency $22_1$-$22_6$.

The control circuit 9 can identify the number of the switch which is pressed from the phase contrast signal and the frequency data of the excitation signal of that time stored in the signal storage circuit 10.

FIGS. 6(a)-6(b) is a block diagram of the coordinate reading system having the second structure.

In the FIGS. 6(a)-6(b), 11 is an adding circuit for adding up the excitation signals of a plurality of frequencies from the frequency divider into one excitation signal, which shapes a plurality of the excitation signals into a sine wave. The added-up excitation signal is supplied to the excitation circuit 4 and then is supplied from the excitation circuit 4 to the first scanning circuit 2. Then, a magnetic field is generated from the first group of sense lines S1. 12 is a frequency discriminating circuit for discriminating a frequency of the induced signal 104 which is induced on the second scanning circuit 3, which outputs a frequency discriminating signal 106 to the control circuit 9 and supplies the induced signal to the phase detection circuit 8. 13 is a switching circuit, which is inputted the excitation signals of a plurality of the frequencies from the frequency divider 6, and supplies the excitation signal having the same frequency as that of the induced signal to the phase detection circuit 8 in response to a control signal from the control circuit 9.

The operation of this embodiment will be explained.

Like the explanation of FIG. 1(a)-1(b), an explanation will be given as to the case that in FIGS. 6(a)-6(b) the coil which composes the resonant circuit 21 of the coordinate indicator 20 is located at the point where a sense line $x_4$ and a sense line $Y_4$ cross (a portion A in FIG. 6(a). The frequency oscillator 7 oscillates at a basic frequency of 1.2288 MHz. The frequency divider 6 divides the signal by two and four and supplies the excitation signals of 614.4 kHz and 307.2 kHz to the adding circuit 11 respectively. The adding circuit 11 adds up a plurality of the excitation signals into one excitation signal and supplies the excitation signal to the excitation circuit 4. Then, the excitation circuit 4 supplies the excitation signal 101 (the signal obtained by adding up a sine wave of 614.4 kHz and a sine wave of 307.2 kHz) to the first scanning circuit 2. Like the first structure, the first scanning circuit 2 selects the sense line $Y_4$ that is the closest to the coordinate indicator 20 among the first group of sense liens S1, and an AC magnetic field corresponding to the excitation signal is generated from the selected sense line. As the AC magnetic field is a magnetic field formed by adding a plurality of the excitation signals, the resonant circuit 21 of the coordinate indicator 20 resonates with the excitation signal and the induced signal (614.4 kHz) is induced on the resonant circuit.

Further, an induced signal is induced on the second group of sense lines S2 by the induced signal on the resonant circuit 21. The second scanning circuit 3 selects the sense line $x_4$ which is the closest to the coordinate indicator 20 among the second group of sense line S2 with a control signal 103 from the control circuit 9, and supplies the induced signal to the frequency discriminating circuit 12. The frequency discriminating circuit 12 discriminates frequency elements of the induced signal, outputs a frequency discriminating signal 106 to the control circuit 9, and supplies the induced signal to the phase detection circuit 8. The control circuit 9 controls the switching circuit 13 according to the frequency discriminating signal 106 so that the switching circuit 13 selects the excitation signal having the same frequency as that of the induced signal among a plurality of the excitation signals from the frequency divider 6 and outputs the excitation signal to the phase detection circuit 8. The phase detection circuit 8 compares the phases of the induced signal and the excitation signal from the switching circuit 13 and outputs a phase contrast signal 105 to the control circuit 9. The control circuit 9 stores the phase contrast signal and the frequency discriminating signal in the signal storing circuit 10.

The potential of the phase contrast signal 105 of the above case corresponds to the press of the switch unit 23 of the coordinate indicator 20 as well as in the first structure, and is determined depending on which device is connected with the resonant circuit 21 of the coordinate indicator 20 among the first group of devices for setting a resonant frequency $21_1$-$21_6$.

Next, an explanation will be given as to the case that any one of the second group of devices for setting frequency $22_1$-$22_6$ is connected with the resonant circuit 21 of the coordinate indicator 20. As a magnetic field which is formed by adding a plurality of the excitation signals is generated from the sense line $Y_4$ of the first group of sense lines, the resonant circuit 21 of the coordinate indicator 20 also resonates and the induced signal (307.2 kHz) is induced also when the resonant circuit 21 is connected with any one of the second group of devices for setting a resonance frequency $22_1$-$22_6$.

Then, an induced signal is generated on the second group of sense lines, and is supplied to the frequency discriminating circuit 12 through the second scanning circuit 3. The frequency discriminating circuit 12 discriminates a frequency of the induced signal 104, outputs the frequency discriminating signal 106 to the control circuit 9, and supplies the induced signal to the phase detection circuit 8. The control circuit 9 controls the switching circuit 13 according to the frequency discriminating signal 106 so that the switching circuit 13 outputs an excitation signal having the same frequency as that of the induced signal to the phase detection circuit 8. The phase detection circuit 8 compares phases of the excitation signal having the same frequency as that of the induced signal from the switching circuit 13 and the induced signal, and obtains the phase contrast signal 105 corresponding to the degree of a phase shift. The control circuit 9 stored the phase contrast signal and the frequency discriminating signal in the signal storage circuit 10.

The control circuit 9 can identify the number of the switch which is pressed from the phase contrast signal and the frequency discriminating signal of the induced signal stored in the signal storage circuit 10.

Furthermore, one embodiment of this invention will be described. FIGS. 7(a) and (b) illustrate structures of a coordinate reading system body and a coordinate indicator respectively.

In FIG. 7(a), 1 shows groups of sense lines, S1 is a first group of sense lines including sense lines $y_1-y_n$, S2 is a second group of sense lines including sense lines $x_1-x_m$, 2 is a first scanning circuit for sequentially selecting each of the first group of sense lines S1, 3 is a second scanning circuit for sequentially selecting each of the second group of sense lines S2, 4 is an excitation circuit for exciting the first group of sense lines S1, 5 is a switching circuit for switching from an excitation signal of one frequency to an excitation signal of other frequency, 6 is a frequency divider for supplying excitation signals of different frequencies to the switching circuit, 7 is a frequency oscillator for supplying a basic signal to the frequency divider, 8 is a phase detection circuit for comparing the phases of an induced signal which is generated on the second group of sense lines S2 and the excitation signal and detecting a phase contrast between the two signals, 9 is a control circuit composed of a general CPU circuit, and 10 is a signal storage circuit for storing a digitized phase contrast signal.

In FIG. 7(b), 20 shows a coordinate indicator, 21 is a first resonant circuit composed of a coil and a capacitor, 22 is a second resonant circuit composed as to resonate with a different frequency from that of the first resonant circuit, a group of $21_1-21_4$ is a first group of capacitors for slightly modifying a resonance frequency of the first resonant circuit, a group of $22_1-22_4$ is a second group of capacitors for slightly modifying a resonance frequency of the second resonant circuit, 23 is an analog switch circuit for selecting anyone of the first group of capacitors and anyone of the second group of capacitors, 24 is an encoder circuit for supplying a selection signal corresponding to a pressed switch to the analog switch circuit, 25 is a switch unit composed of many switches, and 26 is a battery for driving the circuits in the coordinate indicator.

The operation of this embodiment will be explained below.

An explanation will be given as to the case when the coil which composes the first resonant circuit 21 of the coordinate indicator 20 is located on the point where a sense line $x_4$ and a sense line $Y_4$ cross (a portion A in FIG. 7(a)). For instance, the frequency oscillator oscillates at a basic frequency of 1.2288 MHz. The frequency divider 6 divides the basic frequency by two and four and supplies clock signals of 614.4 kHz and 307.2 kHz to the switching circuit respectively. The control circuit 9 controls the switching circuit 5 by the control signal 100 to supply a signal of 614.4 kHz to the excitation circuit 4. Then, the excitation circuit 4 supplies the excitation signal 101 (a sine wave of 614.4 kHz) to the scanning circuit 2.

First of all, a position of the coordinate indicator 20 is detected by, for instance, the conventional technology explained above. The first scanning circuit 2 selects the sense line $Y_4$ of the first group of sense lines S1 with the selection signal 102 supplied from the control circuit 9, and the second scanning circuit 3 selects the sense line $x_4$ of the second group of sense lines S2 with the selection signal 103 supplied from the control circuit 9. In other words, in FIG. 2 the decoder 30 turns on the analog switch $31_4$ with the selection signal 102, supplies the excitation signal 101 (the sine wave of 614.4 kHz) supplied from the excitation circuit 4 to the sense line $Y_4$ of the first group of sense lines by way of the first scanning circuit 2, and a magnetic field of 614.4 kHz is generated from the sense line $Y_4$. As the first resonant circuit 21 of the coordinate indicator is set up to resonate with the frequency of the excitation signal at that time, the induced signal of 614.4 kHz is induced on the first resonant circuit 21.

Further, an induced signal is generated on the second group of sense lines S2 in the vicinity of the first resonant circuit 21 by the induced signal of the first resonant circuit 21. On the other hand, the second scanning circuit 3, as well as the first scanning circuit, selects the sense line $x_4$ of the second group of sense lines by the selection signal 103 supplied from the control circuit 9, and supplies the induced signal which is supplied from the first resonant circuit 21 of the coordinate indicator 20 to the sense line $x_4$, to the phase detection circuit 8.

Next, referring to FIGS. 3 and 4 the operation of the phase detection circuit 8 will be explained. First of all, the induced signal 104 induced on the sense line $x_4$ is amplified by the amplifier 40, and is compared with a ground potential (zero potential) and is converted into a rectangular wave as the induced signal 120 shown in FIG. 4 by the wave shaping circuit 41. Then, the phases of the included signal 120 which is wave converted and the excitation signal 101 are compared by the EX-OR circuit 42, and thereby a phase signal 121 which changes is accordance with the degree of a phase shift is obtained. The phase signal 121 is integrated and converted into a dc voltage signal by the integrating circuit which is composed of the resistor 43 and the capacitor 44, and is binarized by the A/D converter. Then, the binarized phase signal 105 is taken into the control circuit 9 and is stored in the signal storage circuit 10.

The potential of the phase signal 105 in the above case is determined by a slight difference between the resonance frequency of the first resonant circuit 21 of the coordinate indicator 21 and the frequency of the excitation signal. The resonance frequency is determined by the first resonant circuit 21 and the first group of capacitors $21_1$, $21_2$, $21_3$ and $21_4$. The encoder 24 generates a selection signal of the analog switch 27 in response to a press of the switch unit 25. Any one of the first group of capacitors $21_1-21_4$ is connected to the first resonant circuit 21 by the analog switch 23, and the resonance frequency is slightly shifted.

Next, the control circuit 9 controls the switching circuit 5 with the control signal 100 to supply a signal 307.2 kHz to the excitation circuit 4. The excitation signal 101 (a sine wave of 307.2 kHz) is supplied from the excitation circuit 4 to the scanning circuit 2, and a position of the second resonant circuit 22 of the coordinate indicator 20 is again detected by the method which is suggested by the prior art. The control circuit 9 controls the first scanning circuit 2 and the second scanning circuit 3 with the selection signals 102, 103 to select the sense line which is the closest to a position of the second resonant circuit 22 of the coordinate indicator 20 among the first and second groups of sense lines.

As the second resonant circuit 22 of the coordinate indicator 20 is set so as to resonate with the frequency of the excitation signal, an induced signal of 307.2 kHz is induced on the second resonant circuit. Further, an induced signal is generated on the second group of sense lines S2 in the vicinity of the second resonant circuit 22 by the induced signal of the second resonant circuit 22, and the induced signal 104 is supplied to the phase detection circuit 8. Then, like a case of the first resonant circuit, a phase contrast signal between the induced signal and the binarized excitation signal can be obtained by the phase detection circuit 8. The phase contrast signal is taken into the control circuit 9 and stored in the signal storage circuit 10 again.

The phase contrast of the phase contrast signal 105 is determined by the difference between the resonance frequency of the second resonant circuit 22 of the coordinate indicator 20 and the frequency of the excitation signal 101 like a case of the first resonant circuit. The resonance frequency is determined by the second group of capacitors $22_1$, $22_2$, $22_3$ and $22_4$, and the capacitors correspond to the press of the switch unit 25 in the coordinate indicator 20. A selection signal of the analog switch 23 is generated from the encoder 24. Moreover, any one of the second group of capacitors $21_1$–$22_4$ is connected to the second resonant circuit 22 by the analog switch 23.

The control circuit 9 can determine the number of the switch which is pressed from the two phase contrast signals stored in the signal storage circuit 10.

As a battery 26, there can be used solar cells, nickel-cadmium secondary batteries, lithium cells and so on.

Further, in the above embodiment, 1.2288 MHz is used as the basic signal of the frequency oscillator 7, $\frac{1}{2}$ and $\frac{1}{4}$ are used as the dividing ratios of the frequency divider, and a sine wave is used as the excitation signal. However, the frequency, the dividing ratio and the waveform are not limited to the above factors respectively.

Moreover, though in the embodiment the capacitor was explained as a device for modifying the resonance frequency in the coordinate indicator, the same effect can be produced even if the device is composed of a resonator.

As explained above, the first structure has the following features. In the coordinate reading system body, when the group of sense lines which is arranged along one of the xy rectangular coordinate axes is excited by the excitation circuit, the switching circuit is provided between the excitation circuit and the frequency divider so that the sense line group can be excited by a plurality of frequencies. On the other hand, the coordinate indicator includes the resonant circuit which can resonate with one of excitation signals corresponding to a plurality of the frequencies respectively, and thereby in the coordinate indicator the resonant frequency can be slightly modified for every frequency in response to the press of each switch. Such a structure might enable the phase detection circuit of the coordinate reading system body to detect stably six kinds of phase contrast signals with one frequency. In that case, twelve kinds of phase contrast signals can be stably detected by using two different frequencies, and it can be realized to remove a cord from the coordinate indicator having numerous switches of the conventional coordinate reading systems.

In the second structure, when the group of sense lines arranged along one of the xy rectangular coordinate axes is excited by the excitation circuit, the adding circuit is provided between the excitation circuit and the frequency divider so that the excitation circuit can be excited with the signal obtained by adding up the excitation signals corresponding to a plurality of the frequencies. Further, the frequency discriminating circuit is provided previous to the phase detection circuit to discriminate the frequency of the induced signal. Thereby, it is not necessary to switch frequencies of the excitation signal in order to scan the lines, so that the detection time can be substantially shortened.

The third structure might enable the phase detection circuit of the coordinate reading system to detect stably four kinds of phase contrast signals with one frequency. In that case, sixteen kinds of phase contrast signals can be stably detected by using two different frequencies, and it can be realized to remove a cord from the coordinate indicator with numerous switches of the conventional coordinate reading systems.

Therefore, it is possible to provided a coordinate reading system with good operability that the motion of the coordinate indicator is not limited at all when an operator uses the coordinate indicator on the coordinate reading system. Further, there occurs no failure caused by the disconnection of a cord between the coordinate reading system body and the coordinate indicator, which used to be one of defects of the conventional coordinate reading system, and thereby the reliability of the coordinate reading system can be improved.

What is claimed is:

1. A coordinate reading system having a coordinate reading system body and a coordinate indicator comprising: the coordinate reading system body including a first group of sense lines having a plurality of sense lines, a second group of sense lines having a plurality of sense lines, an excitation means for outputting a plurality of frequencies as excitation signals, a selecting means for obtaining an excitation signal among the excitation signals outputted from the excitation means and supplying the obtained excitation signal to the first group of sense lines, a phase detection means for detecting a phase contrast between the excitation signal and an induced signal induced on the second group of sense lines and corresponding to the obtained excitation signal, and a switch identifying means for identifying one or more pressed switches among switches provided on the coordinate indicator from a phase contrast signal outputted by the phase detection means or from the phase contrast signal and information based on the excitation signal; and the coordinate indicator including a resonant means including one or more resonant circuits capable of resonating with one of the excitation signals corresponding to a plurality of the frequencies respectively, a means including a plurality of devices for modifying resonant frequencies of the resonant means by being connected thereto, and a switching means including a plurality of switches for connecting at least one of the devices to the resonant means.

2. A coordinate reading system in accordance with claim 1 wherein said selecting means selects one excitation signal among the excitation signals corresponding to a plurality of the frequencies.

3. A coordinate reading system in accordance with claim 1 wherein said selecting means produces a composite excitation signal composed of the excitation signals corresponding to a plurality of the frequencies.

4. A coordinate reading system in accordance with claim 3 further comprising a frequency discriminating means for discriminating a frequency of an induced signal induced on the second group of sense lines.

5. A coordinate reading system in accordance with claim 4 further comprising a means for selecting an excitation signal having the same frequency as that of the induced signal induced on the second group of the sense lines among the excitation signals corresponding to a plurality of the frequencies according to a signal outputted from the frequency discriminating means and for outputting the obtained excitation signal to the phase detection means.

6. A coordinate reading system in accordance with claim 2 wherein said coordinate indicator includes the resonant means including a plurality of the resonant circuits, the means including each group of a plurality of devices corresponding to each of the resonant circuits respectively and connected thereto respectively, and the switching means for selecting simultaneously at least one devices among each group of devices respectively and connecting the selected devices to each of the resonant means respectively.

* * * * *